(12) United States Patent
Moschet et al.

(10) Patent No.: US 10,283,824 B2
(45) Date of Patent: May 7, 2019

(54) THERMAL EXCHANGE ASSEMBLY FOR VEHICLE BATTERY

(71) Applicant: FORD GLOBAL TECHNOLOGIES, LLC, Dearborn, MI (US)

(72) Inventors: Dave Moschet, Dearborn, MI (US); Kimberley King, Northville, MI (US); Saravanan Paramasivam, South Lyon, MI (US); Sai K. Perumalla, Rochester Hills, MI (US); Rajaram Subramanian, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 76 days.

(21) Appl. No.: 15/493,954

(22) Filed: Apr. 21, 2017

(65) Prior Publication Data

US 2018/0309176 A1    Oct. 25, 2018

(51) Int. Cl.
*H01M 10/625*    (2014.01)
*H01M 10/6556*   (2014.01)
*H01M 2/02*      (2006.01)

(52) U.S. Cl.
CPC ..... *H01M 10/6556* (2015.04); *H01M 10/625* (2015.04); *H01M 2220/20* (2013.01)

(58) Field of Classification Search
CPC .. H01M 10/6556; H01M 10/625; H01M 2/10; H01M 2/12; H01M 2/02
See application file for complete search history.

(56) References Cited

U.S. PATENT DOCUMENTS

| | | | |
|---|---|---|---|
| 8,288,048 B2 | 10/2012 | Thompson | |
| 9,450,275 B2 | 9/2016 | Obasih et al. | |
| 2011/0033742 A1* | 2/2011 | Maier | F28F 9/0263 |
| | | | 429/120 |
| 2012/0199129 A1* | 8/2012 | Kenyon | A61M 16/0066 |
| | | | 128/205.25 |
| 2012/0199331 A1 | 8/2012 | Maurer et al. | |
| 2013/0192807 A1 | 8/2013 | DeKeuster | |
| 2014/0030560 A1 | 1/2014 | Lev et al. | |
| 2014/0186669 A1* | 7/2014 | Obasih | H01M 2/0262 |
| | | | 429/71 |
| 2014/0295228 A1 | 10/2014 | Yan et al. | |
| 2014/0356652 A1 | 12/2014 | Boddakayala et al. | |
| 2015/0111082 A1* | 4/2015 | Sumpf | H01M 2/105 |
| | | | 429/120 |
| 2015/0200427 A1 | 7/2015 | Haskins et al. | |
| 2015/0236325 A1 | 8/2015 | Miller et al. | |
| 2016/0248133 A1 | 8/2016 | Iqbal et al. | |

FOREIGN PATENT DOCUMENTS

EP    2879228 A1    6/2015

\* cited by examiner

*Primary Examiner* — Kenneth J Douyette
(74) *Attorney, Agent, or Firm* — Carlson, Gaskey & Olds, P.C.

(57) ABSTRACT

A battery assembly according to a non-limiting aspect of the present disclosure includes, among other things, a housing, an array of battery cells provided within the housing, and a thermal exchange assembly adjacent the array and including an inlet, an outlet, and a tube configured to direct fluid from the inlet to the outlet. Further, the tube is overmolded with the housing. This disclosure also relates to a method of forming a battery assembly.

15 Claims, 11 Drawing Sheets

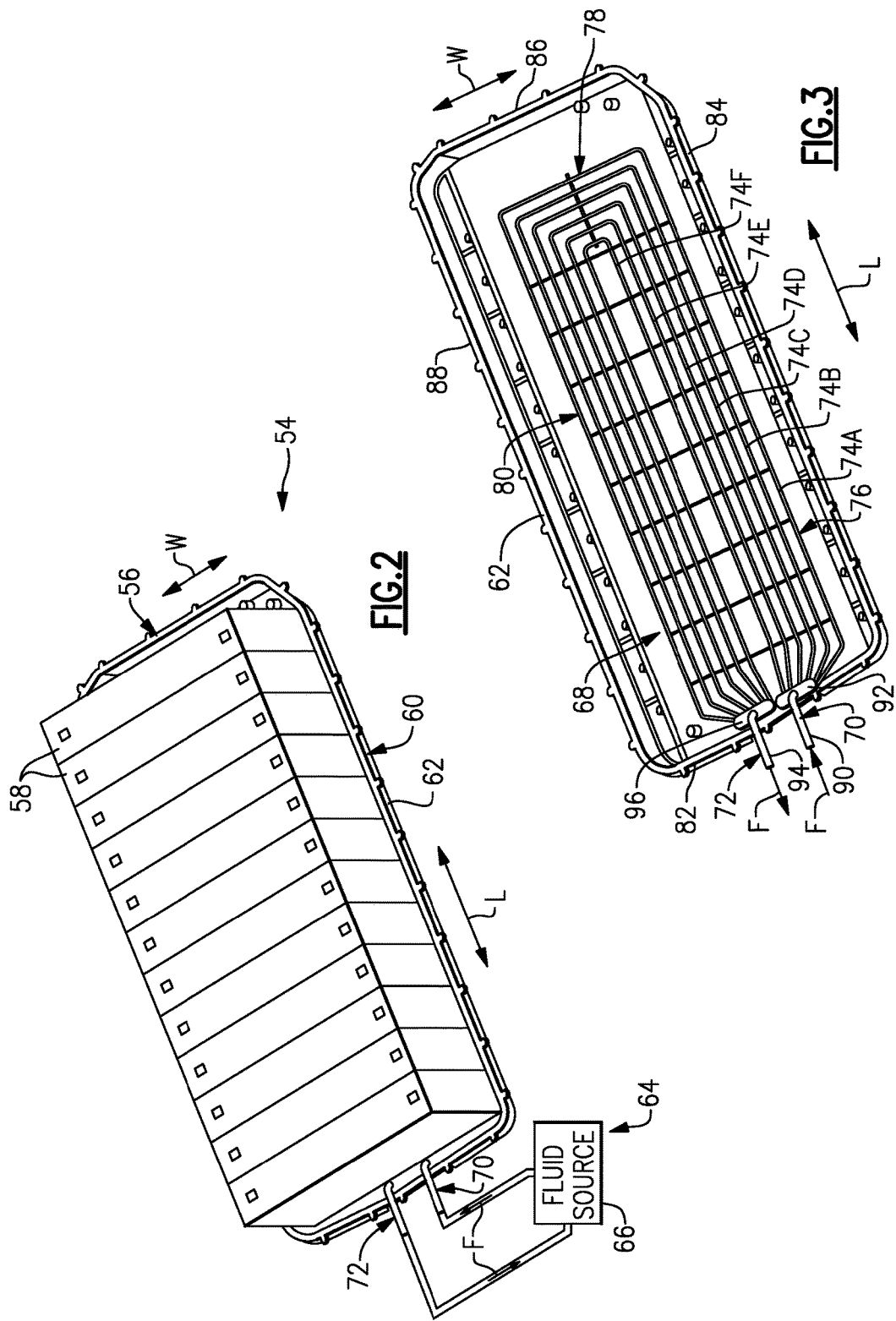

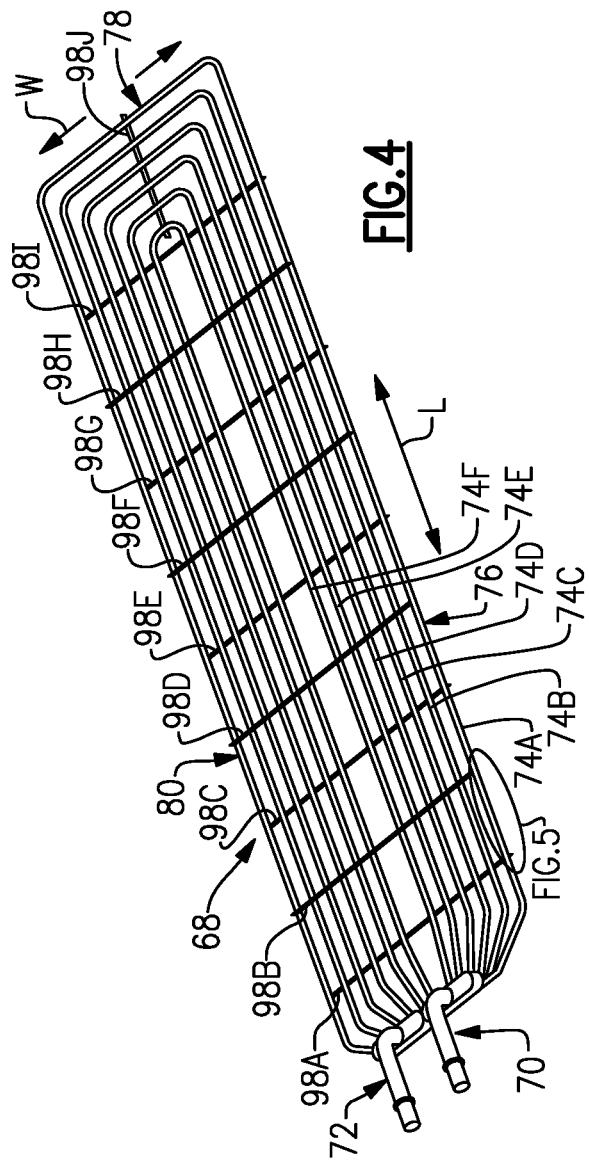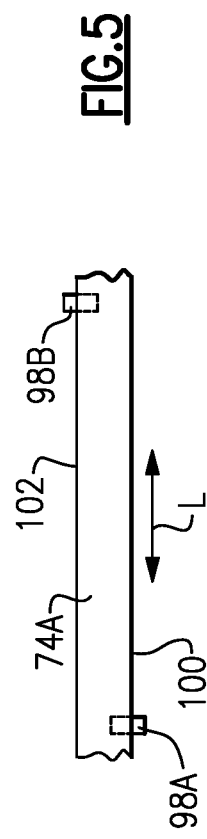
FIG.4
FIG.5

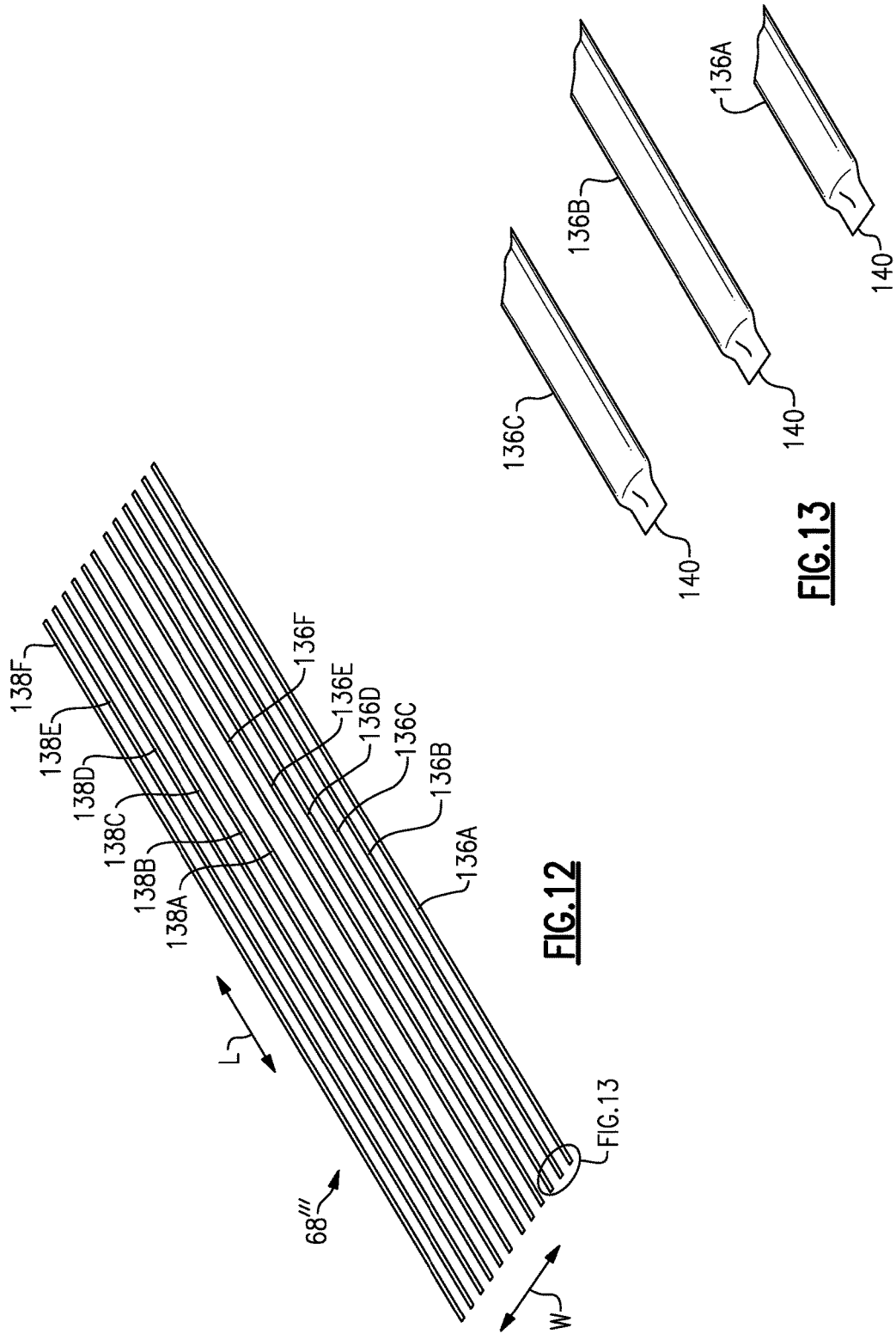

THERMAL EXCHANGE ASSEMBLY FOR VEHICLE BATTERY

BACKGROUND

This disclosure relates to a battery assembly for an electrified vehicle. The battery assembly has a thermal exchange assembly, which includes tubes overmolded with a housing of the battery assembly.

The need to reduce automotive fuel consumption and emissions is well known. Therefore, vehicles are being developed that reduce or completely eliminate reliance on internal combustion engines. Electrified vehicles are one type of vehicle being developed for this purpose. In general, electrified vehicles differ from conventional motor vehicles because they are selectively driven by battery powered electric machines. Conventional motor vehicles, by contrast, rely exclusively on an internal combustion engine to propel the vehicle.

A high voltage battery pack for powering electric machines and other electrical loads typically includes multiple battery cells. The battery cells give off heat during charging and discharging operations. It is often desirable to dissipate this heat from the battery pack to improve the capacity and life of the battery cells.

SUMMARY

A battery assembly according to a non-limiting aspect of the present disclosure includes, among other things, a housing, an array of battery cells provided within the housing, and a thermal exchange assembly adjacent the array and including an inlet, an outlet, and a tube configured to direct fluid from the inlet to the outlet. Further, the tube is overmolded with the housing.

In a further non-limiting embodiment of the foregoing battery assembly, the inlet includes an inlet plenum, the outlet includes an outlet plenum, and the tube is one of a plurality of tubes configured to direct fluid from the inlet plenum to the outlet plenum.

In a further non-limiting embodiment of any of the foregoing battery assemblies, the assembly further includes a thermal transfer plate overmolded with the housing and provided between the plurality of tubes and the array.

In a further non-limiting embodiment of any of the foregoing battery assemblies, the assembly further includes an electromagnetic compatibility (EMC) shield including a plurality of walls projecting from the thermal transfer plate.

In a further non-limiting embodiment of any of the foregoing battery assemblies, the assembly further includes a return plenum provided at an opposite end of the housing than the inlet and outlet plenums.

In a further non-limiting embodiment of any of the foregoing battery assemblies, the plurality of tubes includes a plurality of inlet-side tubes configured to direct fluid from the inlet plenum to the return plenum, and the plurality of tubes includes a plurality of outlet-side tubes configured to direct fluid from the return plenum to the outlet plenum.

In a further non-limiting embodiment of any of the foregoing battery assemblies, each of the inlet-side tubes and the outlet-side tubes are substantially straight tubes extending in a direction substantially parallel to a length of the battery assembly.

In a further non-limiting embodiment of any of the foregoing battery assemblies, each of the plurality of tubes is a single tube including an inlet side, a turning section, and an outlet side.

In a further non-limiting embodiment of any of the foregoing battery assemblies, a first one of the plurality of tubes defines a first tube perimeter, and a second one of the plurality of tubes is provided entirely within the first tube perimeter.

In a further non-limiting embodiment of any of the foregoing battery assemblies, the assembly further includes a plurality of die setting brackets connecting the first tube to the second tube. Further, a first one of the die setting brackets projects from a first side of the first tube to a first side of the second tube, a second one of the die setting brackets projects from a second side of the first tube to a second side of the second tube, and the first sides of the first and second tubes are opposite the second sides of the first and second tubes.

In a further non-limiting embodiment of any of the foregoing battery assemblies, the first tube is one of a first set of tubes configured to direct fluid from the inlet plenum to the outlet plenum in a first direction, and the second tube is one of a second set of tubes configured to direct fluid from the inlet plenum to the outlet plenum in a second direction opposite the first direction.

In a further non-limiting embodiment of any of the foregoing battery assemblies, each of the plurality of tubes are laterally spaced-apart from one another.

In a further non-limiting embodiment of any of the foregoing battery assemblies, each of the plurality of tubes are substantially the same size and shape.

A method of forming a battery assembly according to a non-limiting aspect of the present disclosure includes, among other things, overmolding a tube of a thermal exchange assembly with a housing of the battery assembly.

In a further non-limiting embodiment of the foregoing method, the tube is initially formed with a closed end.

In a further non-limiting embodiment of any of the foregoing methods, the method further includes forming a plenum by machining the housing and a closed end of the tube.

In a further non-limiting embodiment of any of the foregoing methods, the tube is a first tube, the thermal exchange assembly includes a second tube overmolded with the housing, and the first and second tubes are connected by a first die setting bracket and a second die setting bracket arranged to allow material to flow around the thermal exchange assembly during the overmolding step.

In a further non-limiting embodiment of any of the foregoing methods, the first die setting bracket projects from a first side of the first tube to a first side of the second tube, and the second die setting bracket projects from a second side of the second tube to a second side of the second tube. Further, the second sides are opposite the first sides.

In a further non-limiting embodiment of any of the foregoing methods, the method further includes arranging the first tube to define a first perimeter, and arranging the second tube within the first perimeter.

In a further non-limiting embodiment of any of the foregoing methods, the method further includes arranging the second tube such that the second tube is laterally-spaced apart from the first tube.

BRIEF DESCRIPTION OF THE DRAWINGS

FIG. 2 schematically illustrates a battery pack of an electrified vehicle.

FIG. 3 illustrates a battery pack of an electrified vehicle. In FIG. 3, a portion of a housing of the battery pack is transparent for purposes of illustrating an example thermal exchange assembly.

FIG. 4 illustrates the example thermal exchange assembly of FIG. 3 without the remainder of the battery pack.

FIG. 5 is a close-up view of the encircled area in FIG. 4, and illustrates the arrangement of the die-setting brackets of the thermal exchange assembly.

FIG. 12 is a perspective view illustrating the tubes of the fourth example thermal exchange assembly without the remainder of the battery pack.

FIG. 13 is a view of the encircled area in FIG. 12 and illustrates the ends of the tubes.

DETAILED DESCRIPTION

This disclosure relates to an assembly for an electrified vehicle. The assembly may be a battery assembly that includes a thermal exchange assembly for thermally managing heat generated by battery cells of the battery assembly. In one example, the thermal exchange assembly includes an inlet, an outlet, and a tube configured to direct fluid from the inlet to the outlet. Further, the tube is overmolded with a housing of the battery assembly. Such an arrangement integrates the tube directly into the battery assembly housing, which reduces the number of required mechanical connections and assembly steps. In turn, the arrangement reduces the likelihood of fluid leaks and reduces the size of the overall assembly. As such, fluid can be directed through the assembly at higher pressures and increased flow rates, which increases heat transfer. These and other features are discussed in greater detail in the following paragraphs of this detailed description.

Figure 1:
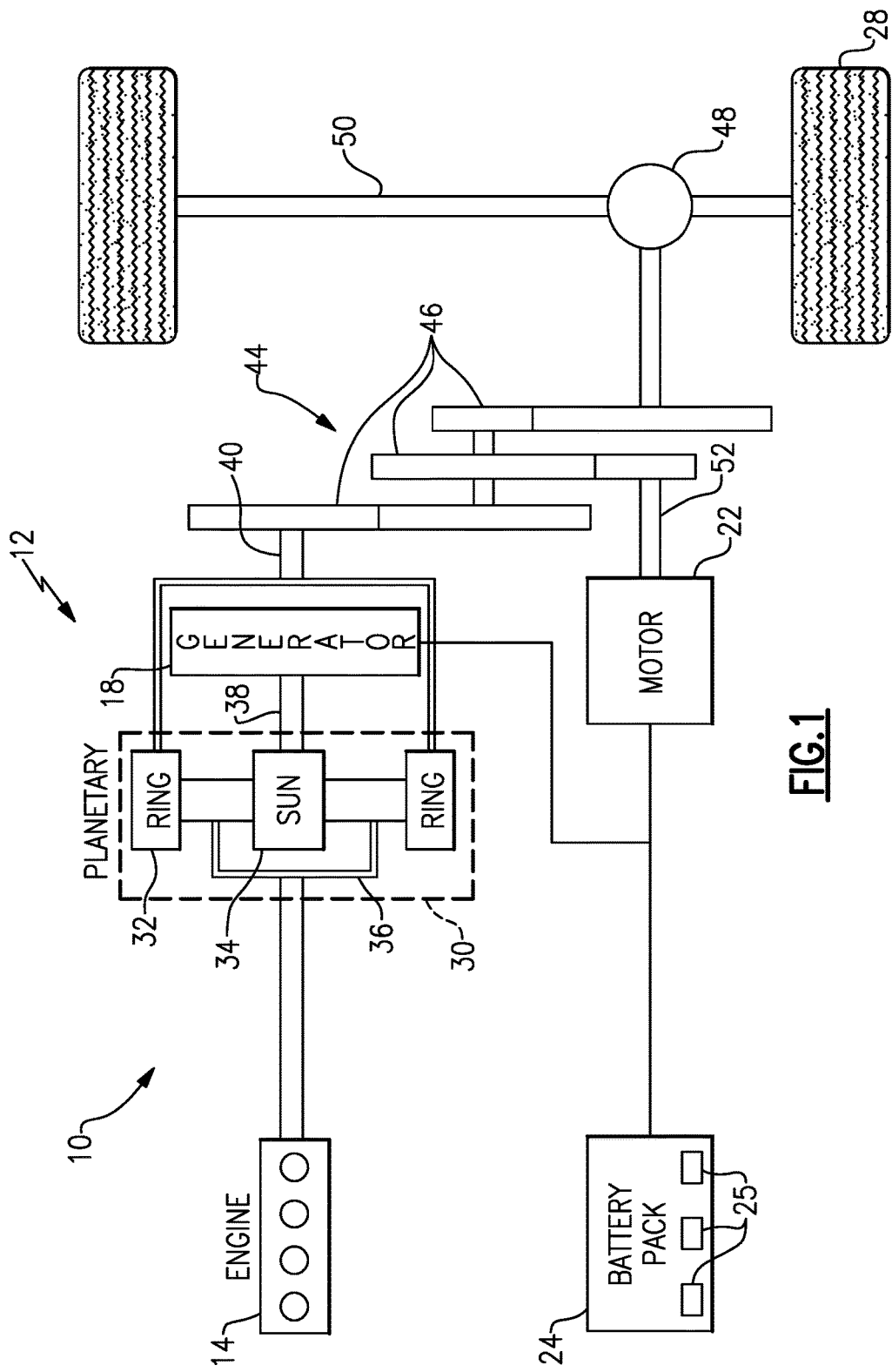
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEVs and could extend to other electrified vehicles, including, but not limited to, plug-in hybrid electric vehicles (PHEVs) and battery electric vehicles (BEVs).

In one embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery assembly 24. In this example, the second drive system is considered an electric drive system of the powertrain 10. The first and second drive systems generate torque to drive one or more sets of vehicle drive wheels 28 of the electrified vehicle 12. Although a power-split configuration is shown, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery assembly 24.

The battery assembly 24 is an exemplary electrified vehicle battery. The battery assembly 24 may be a high voltage traction battery pack that includes a plurality of battery assemblies 25 (i.e., battery arrays or groupings of battery cells) capable of outputting electrical power to operate the motor 22, the generator 18 and/or other electrical loads of the electrified vehicle 12. Other types of energy storage devices and/or output devices can also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery assembly 24 state of charge up to its maximum allowable discharging rate under certain driving patterns/cycles. The EV mode is an example of a charge depleting mode of operation for the electrified vehicle 12. During EV mode, the state of charge of the battery assembly 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery assembly 24 at a constant or approximately constant level by increasing the engine 14 propulsion usage. The electrified vehicle 12 may be operated in other operating modes in addition to the EV and HEV modes within the scope of this disclosure.

FIG. 2 illustrates a battery assembly 54 that can be incorporated into an electrified vehicle. For example, the battery assembly 54 could be employed within the electrified vehicle 12 of FIG. 1. The battery assembly 54 includes one battery array 56, which is a grouping of battery cells, for supplying electrical power to the electric machine and various other vehicle components. Although one battery array 56 is illustrated in FIG. 2, the battery assembly 54 could include multiple battery arrays. In other words, this disclosure is not limited to the specific configuration shown in FIG. 2.

The battery array 56 includes a plurality of battery cells 58 that may be stacked adjacent one another in a direction of the length L of the battery array 56. Although not shown in FIG. 2, the battery cells 58 are electrically connected to one another using busbar assemblies. In one embodiment, the battery cells 58 are prismatic, lithium-ion cells. However, battery cells having other geometries (cylindrical, pouch, etc.) and/or other chemistries (nickel-metal hydride, lead-acid, etc.) could alternatively be utilized within the scope of this disclosure.

An enclosure assembly 60 surrounds the battery array 56. The enclosure assembly 60 includes a housing 62 for housing the battery array 56 and, potentially, any other components of the battery assembly 54. In one non-limiting embodiment, the housing 62 is a tray surrounding a lower portion of the battery array 56. The enclosure assembly 60 may further include one or more covers which, together with the tray, fully surround the battery array 56. The enclosure assembly 60 may take any size, shape or configuration, and is not limited to the specific configuration of FIG. 2.

During some conditions, heat may be generated by the battery cells 58 of the battery array 56 during charging and discharging operations. Heat may also be transferred into the battery cells 58 during vehicle key-off conditions as a result of relatively hot ambient conditions. During other conditions, such as relatively cold ambient conditions, the battery cells 58 may need to be heated. A thermal management system 64 may therefore be utilized to thermally condition (i.e., heat or cool) the battery cells 58.

The thermal management system 64, for example, may include a fluid source 66 and at least one thermal exchange assembly 68. An example thermal exchange assembly 68 is shown in FIGS. 3-4. In some examples the thermal exchange assembly 68 may be referred to as a cold plate assembly, although in some embodiments of this disclosure the thermal exchange assembly 68 does not truly include a plate.

FIG. 3 is a view of the battery assembly 54 with the housing 62 drawn partially transparent for purposes of illustration only. In FIG. 3, the example thermal exchange assembly 68 is arranged adjacent the battery array 56, and includes an inlet 70, an outlet 72, and at least one tube configured to direct fluid F from the inlet 70 to the outlet 72. The inlet 70 and outlet 72 are fluidly coupled to the fluid source 66. In the example of FIG. 3, there are six tubes 74A-74F between the inlet and outlet 70, 72. It should be understood that this disclosure extends to thermal exchange assemblies having one or more tubes. Further, it should be understood that the fluid F could be any type of coolant, including glycol for example.

The tubes 74A-74F are overmolded with the housing 62. Overmolding is the process of adding material over an already-existing piece or part using a molding process. The result is an integrated component including the original piece and the additional material added via the overmolding process. Here, the thermal exchange assembly 68 is the original piece, and the housing 62 is provided by molding additional material over the tubes 74A-74F. The method of making the battery assembly 54 will be described in more detail below.

In the example of FIG. 3, each of the tubes 74A-74F is a provided by a single, continuous tube. For example, the tube 74A includes an inlet side 76, a turning section 78, and an outlet side 80. In this example, the inlet 70 is provided adjacent a first end 82 of the battery assembly 54. The inlet side 76 of the tube 74A extends from the inlet 70 along a first side 84 of the battery assembly 54 in a direction of the length L to a location adjacent a second end 86 of the battery assembly 54. The turning section 78 extends in a direction of the width W of the battery assembly 54 from a location adjacent a first side 84 of the battery assembly 54 to a second side 88. The outlet side 80 of the tube 74A extends along the second side 88 in the direction of the length L from the second end 86 to the first end 82, where the outlet 72 is located. While only the tube 74A is described above, it should be understood that each of the tubes 74A-74F includes an inlet side, a turning section, and an outlet side configured to direct fluid F within the battery assembly 54 from the inlet 70 to the outlet 72.

In the example of FIG. 3, each of the tubes 74A-74F is a different size. For example, the tube 74A is the outermost one of the tubes 74A-74F and defines a first tube perimeter, which includes the inlet side 76, turning section 78, and outlet side 80. The tube 74B is spaced-apart inwardly from the tube 74A, and is provided entirely within the first tube perimeter defined by the tube 74A. Tube 74C is likewise spaced-apart inwardly from the tube 74B, and so on.

The tubes 74A-74F are provided with fluid F from the inlet 70 via a plenum, and likewise the tubes 74A-74F return the fluid F to the outlet 72 via a plenum. In this example, the inlet 70 includes an inlet pipe 90 and an inlet plenum 92. The outlet 72 likewise includes an outlet pipe 94 and an outlet plenum 96. Each of the tubes 74A-74F are directly coupled to the inlet plenum 92 at one end and the outlet plenum 96 at another end. Thus, each of the tubes 74A-74F is configured to direct fluid F from the inlet plenum 92 to the outlet plenum 96.

FIG. 4 illustrates the thermal exchange assembly 68 of FIG. 3 without the housing 62. As noted above, the thermal exchange assembly 68 is formed before it is overmolded with the housing 62. In order to maintain the structural integrity of the thermal exchange assembly 68 before and during the overmolding process, the thermal exchange assembly 68 includes a plurality of die setting brackets 98A-98J. In this example, each die setting bracket 98A-98J connects the tubes 74A-74F to one another. Here, there are a total of ten die setting brackets 98A-98J. It should be understood that this disclosure extends to thermal exchange assemblies with a different number of die setting brackets.

In this example, there is a set of die setting brackets 98A-98I that are spaced-apart from one another along the direction of the length L, and that extend in a direction substantially parallel to a direction of the width W. Notably, while the battery assembly 54 is not shown in FIG. 4, the directions of the length and width L, W are used herein to refer to the arrangement of the thermal exchange assembly 68 as it would be positioned in the battery assembly 54. Each of the die setting brackets 98A-98I are connected to each the tubes 74A-74F, and are further connected to both the inlet and outlet sides 76, 80 of each of the tubes 74A-74F. Thus, these die setting brackets 98A-98I are connected to each of the tubes 74A-74F in two locations. The example of FIG. 4 also includes one die setting bracket 98J extending in a direction substantially parallel to a direction of the length L of the battery assembly 54, and is connected to each of the tubes 74A-74F at a location adjacent the turning sections 78 of the tubes. It should be understood that there could be a different number of die setting brackets in other examples.

FIG. 5 is a side view of a portion of the tube 74A, and shows one example arrangement of the die setting brackets relative to the thermal exchange assembly 68. In this example, the die setting brackets are provided in an alternating arrangement, such that adjacent die setting brackets project from opposite sides of the tubes. FIG. 5 shows two adjacent die setting brackets 98A, 98B. In this example, the die setting bracket 98A projects from a first side 100 of the tube 74A and projects from a corresponding side of the remaining tubes 74B-74F. The die setting bracket 98B projects from a second side 102 of the tube 74A, which is opposite the first side 100, and also projects from a corresponding side of the remaining tubes 74B-74F. In this example, the first side 100 is a bottom of the tube 74A, and the second side 102 is a top of the tube 74A. While only two die setting brackets 98A, 98B are shown in FIG. 5, it should be understood that the remaining die setting brackets 98C-98I continue on in an alternating arrangement (e.g., die setting bracket 98C projects from the first side 100, and so on). The alternating die setting bracket arrangement is useful when overmolding the tubes 74A-74F with the housing 62. One example overmolding process will now be described.

Figure 6:
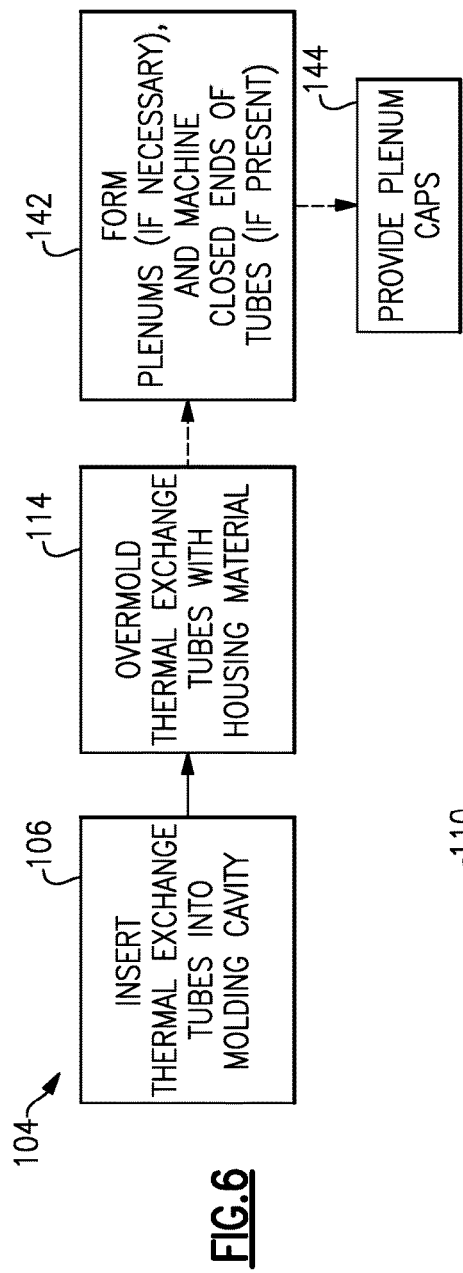
FIG. 6 is a flow chart representative of an example method of manufacturing the battery pack.

FIG. 6 is a flow chart representative of one example method 104 of forming the battery assembly 54. The method 104 will be described with reference to FIGS. 6-8. In the method 104, the thermal exchange assembly 68, including the thermal exchange tubes 74A-74F, is placed into a mold cavity at 106.

Figure 7:
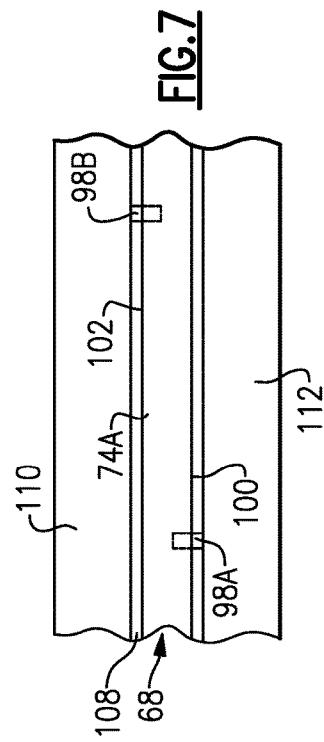
FIG. 7 is a side view illustrating a portion of the thermal exchange assembly in a molding cavity.

FIG. 7 illustrates a portion of a molding cavity 108 between first and second mold plates 110, 112, and further illustrates a portion of the thermal exchange assembly 68 in the molding cavity 108. FIG. 7 is a side view, and thus only the tube 74A is visible. The die setting brackets 98A, 98B are in direct contact with one of the mold plates 110, 112. In particular, the die setting bracket 98A is in direct contact with the second mold plate 112, and the die setting bracket 98B is in direct contact with the first mold plate 110. In some embodiments, the first and second mold plates 110, 112 have channels that act as locating features for receiving the die setting brackets 98A, 98B, and thereby assist in aligning the thermal exchange assembly 68 within the molding cavity 108.

Because of the alternating arrangement of the die setting brackets 98A, 98B, the material that ultimately forms the housing 62 can flow relatively easily within the molding cavity 108 during the overmolding process. For example, at a location adjacent the die setting bracket 98A, material can flow around the tube 74A on the second side 102, because there is no die setting bracket in that location. Likewise, adjacent the die setting bracket 98B, material can flow around the tube 74A adjacent the first side 100.

With reference to FIG. 6, after the thermal exchange assembly 68 is placed in the molding cavity 108, the thermal exchange assembly 68 is overmolded with the housing 62, and in particular the tubes 74A-74 are overmolded with the housing 62, at step 114. In this example, the overmolding process (sometimes referred to as insert molding) includes a molding process wherein a material having a different chemical composition than the tubes 74A-74F is injected into the molding cavity 108, and bonds to the tubes 74A-74F as it cools. In one particular example, the tubes 74A-74F are formed of steel, aluminum, or iron or copper, and the material injected into the molding cavity is plastic or magnesium. The plastic or magnesium or aluminum material will ultimately take the shape of the molding cavity and form the housing 62. This disclosure is not limited to these particular example materials, however.

Figure 8:
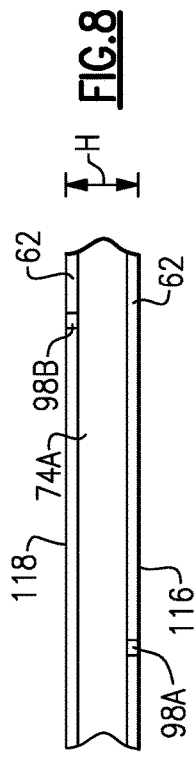
FIG. 8 is a side view illustrating a portion of the thermal exchange assembly being overmolded with the housing of the battery assembly.

The result of step 114 is illustrated in FIG. 8. As shown, the tube 74A is completely surrounded by the housing 62. Further, in this example, ends of the die setting brackets 98A, 98B are flush with first and second surfaces 116, 118 of the housing 62, which correspond to an underside and an interior of the housing 62, respectively. As shown in FIG. 8, the housing 62 exhibits a height H, which is reduced relative to battery assemblies that do not have overmolded tubes. As such, the battery assembly 54 occupies less space in the vehicle than battery assemblies without overmolded tubes. Further, since the tubes 74A-74F are overmolded with the housing 62, there are fewer mechanical connections within the battery assembly 54. Thus, the likelihood of leaks is significantly reduced. Further, the fluid F can be directed through the tubes 74A-74F at an increased pressure, which in turn increases the efficiency of the thermal exchange assembly 68.

Figure 9:
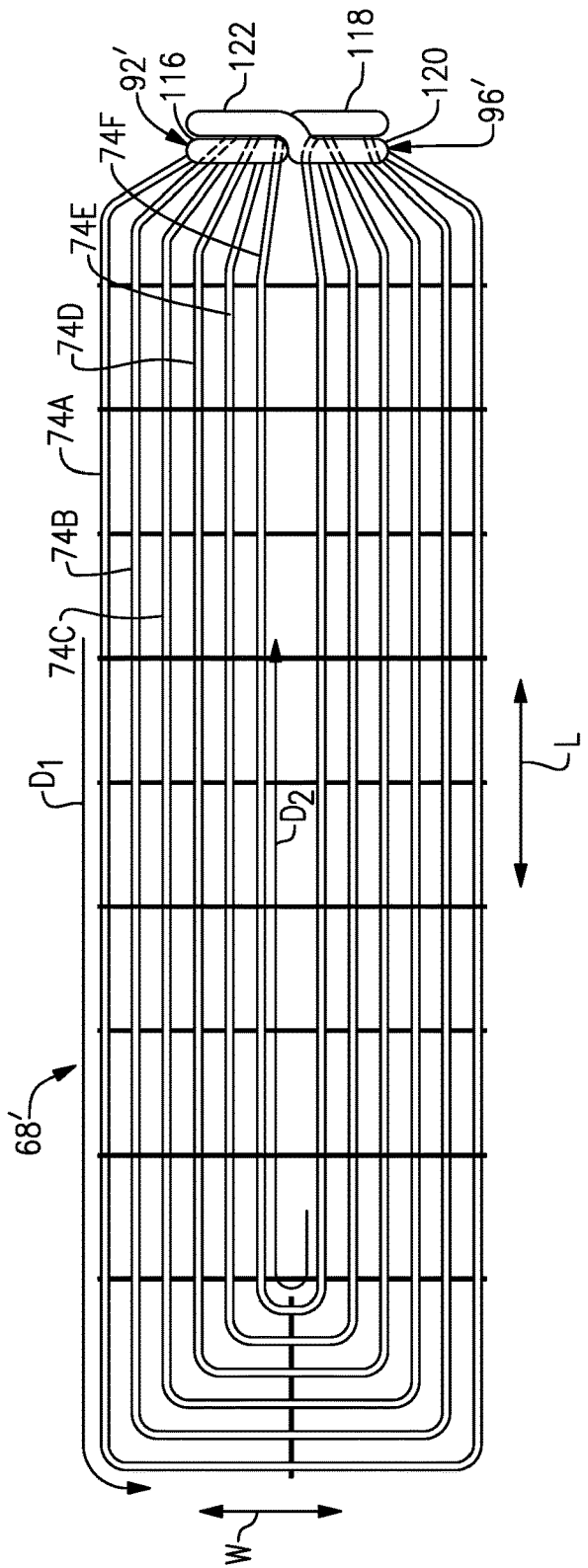
FIG. 9 illustrates a second example thermal exchange assembly without the remainder of the battery pack.

FIG. 9 illustrates another example thermal exchange assembly 68', which has an alternate tube and plenum arrangement. The thermal exchange assembly 68' can be incorporated into a battery assembly, such as that of FIG. 2. In the example of FIG. 9, fluid F is circulated within the battery assembly 54 in two different directions. For example, the thermal exchange assembly 68' has a plurality of tubes 74A-74F arranged such that the tubes are spaced inward of one another, substantially as described above relative to FIGS. 3 and 4. Further, it should be understood that the tubes 74A-74F are overmolded with the housing 62, as in the prior embodiment.

The thermal exchange assembly 68' includes inlet and outlet plenums 92', 96' that are different than those described above. The arrangement of the tubes 74A-74F relative to the plenums 92', 96' allows the fluid F to flow in two different directions.

In this example, there is a first set of tubes configured to direct fluid F from the inlet plenum 92' to the outlet plenum 96' in a first direction $D_1$, which in this example is a counter-clockwise direction. The first set of tubes includes tubes 74A, 74C, and 74E. Further, there is a second set of tubes configured to direct fluid F in a second direction $D_2$ opposite the first direction $D_1$. In this example, the second direction $D_2$ is a clockwise direction. The second set of tubes includes tubes 74B, 74D, and 74F. In this example, the first and second sets of tubes are alternating, such that the outermost tube 74A is one of the first set of tubes, and the immediately inward tube 74B is one of the second set of tubes, and so on.

The inlet and outlet plenums 92', 96' are larger in this example than in the embodiment of FIGS. 3-4. In this example, the inlet plenum 92' includes a first section 116 and a second section 118. The second section 118 is spaced-apart from the first section 116 in a direction of the length L. The outlet plenum 96' likewise includes a first section 120 aligned with the first section 116 in the direction of the length L, and a second section 122 aligned with the second section 118 in the direction of the length L. The first and second sections 120, 122 of the outlet plenum 96' are spaced-apart from one another in the direction of the length L. Further, like in the previous embodiment, the inlet and outlet plenums are fluidly coupled to inlet and outlet pipes, respectively, but those pipes are not shown in FIG. 9 for purposes of illustrating the remainder of the thermal exchange assembly 68'.

With continued reference to FIG. 9, the first set of tubes are fluidly coupled to the first section 116 of the inlet plenum 92' and the first section 120 of the outlet plenum 96', and the second set of tubes are fluidly coupled to the second section 118 of the inlet plenum 92' and the second section 122 of the outlet plenum 96'. For example, the tube 74A is fluidly coupled to the first section 116 of the inlet plenum 92' and is configured to direct fluid F in the direction $D_1$ to the first section 120 of the outlet plenum 96'. Further, the tube 74B is fluidly coupled to the second section 118 of the inlet plenum 92', which is on a generally opposite side (relative to the width W) of the first section 116 of the inlet plenum 92'. The tube 74B directs fluid F from the second section 118 in the direction $D_2$ to the second section 122 of the outlet plenum 96'.

The arrangement of FIG. 9 evenly distributes cooling between the sides of the battery array 56. In the embodiment of FIGS. 3 and 4, the side of the battery array 56 adjacent the inlet 70 may experience additional cooling, because the fluid F within the tubes adjacent the outlet 72 may be relatively warm. Accordingly, the arrangement of FIG. 9 may increase the efficiency of heat transfer. While one example plenum arrangement has been shown and described in FIG. 9, other plenum arrangements that direct fluid in opposite directions come within the scope of this disclosure.

Figure 10:
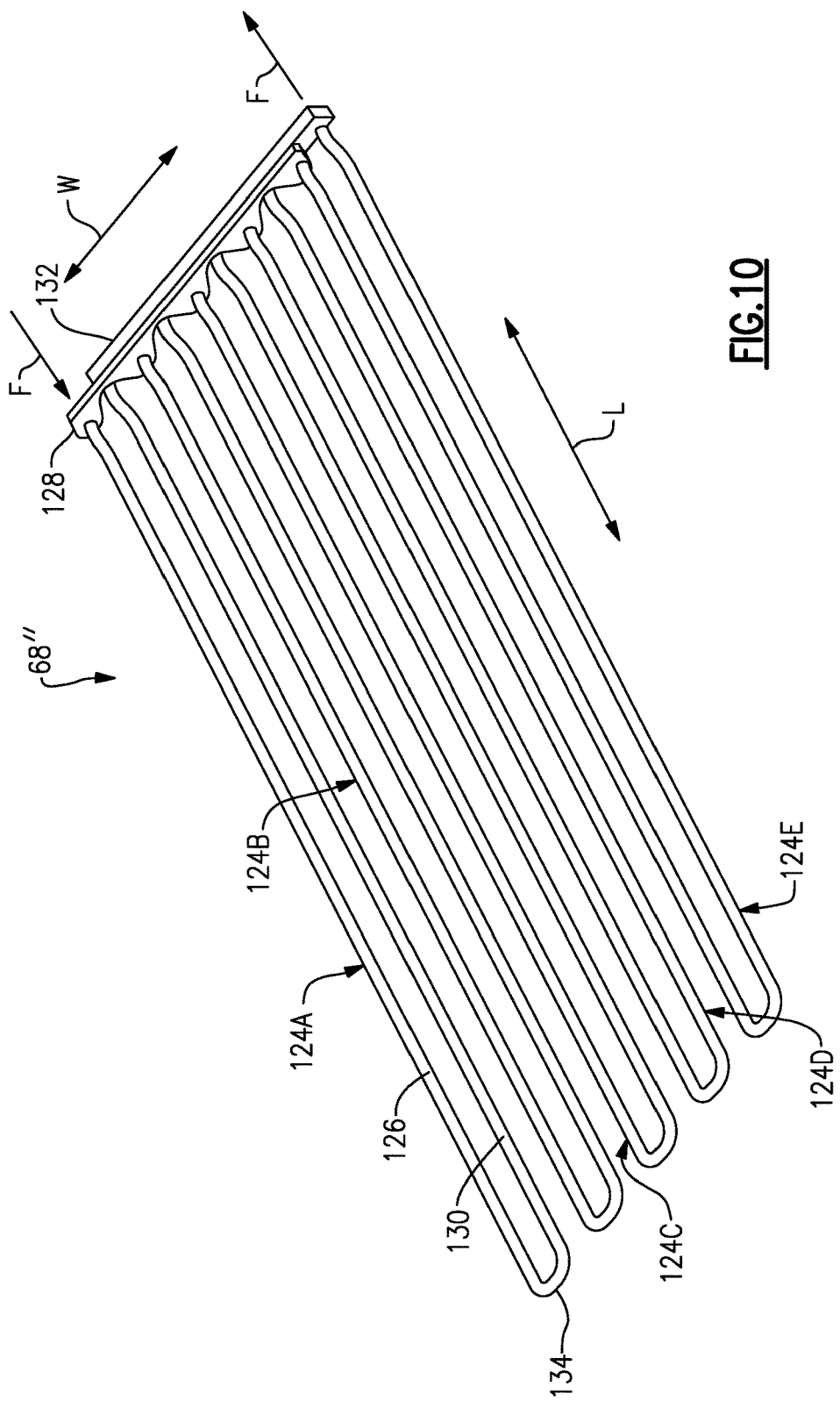
FIG. 10 illustrates a third example thermal exchange assembly without the remainder of the battery pack.

FIG. 10 illustrates another example thermal exchange assembly 68". In this example, the thermal exchange assembly 68" includes a plurality of tubes that are substantially the same size and shape, unlike the tubes in the examples of FIGS. 2-4 and 9, which are different sizes. Providing the same size tubes may reduce manufacturing costs and increase ease of assembly.

With continued reference to FIG. 10, the thermal exchange assembly 68" includes tubes 124A-124E that are laterally spaced-apart from one another, relative to the direction of the width W. For example, the tube 124A includes an inlet side 126 fluidly coupled to an inlet plenum 128, an outlet side 130 fluidly coupled to an outlet plenum 132, and a turning section 134 configured to turn the fluid F and direct the fluid F from the inlet side 126 to the outlet side 130. The inlet and outlet sides 126, 130 of the tube 124A span along substantially the entire length (e.g., in the direction L) of the battery assembly 54. Each of the tubes 124A-124E are arranged in substantially the same way as the tube 124A.

Again, the tubes 124A-124E are laterally spaced-apart from one another. In this example, the tube 124A defines a first tube perimeter, and the tube 124B is laterally spaced-apart from that first tube perimeter in a direction of the width W. Further, the tube 124C is laterally spaced-apart from a second tube perimeter defined by the tube 124B, as so on.

In this example, the inlet and outlet plenums 128, 132 extend in the direction of the width W. The outlet plenum 132, in this example, is spaced-apart from the inlet plenum 128 in the direction of the length L. As such, the inlet side 126 of the tubes 124A-124E is shorter than the outlet side 130 of the tubes 124A-124E. While one particular plenum arrangement is shown in this disclosure, it should be understood that the thermal exchange assembly 68" could include other plenum arrangements.

Positioning the tubes 124A-124E as shown in FIG. 10 increases the uniformity of cooling along the direction of the width W of the battery assembly 54, which increases cooling efficiency. It should be understood that the tubes 124A-124E are also overmolded with a housing of the battery assembly, as described relative to the previous embodiments.

Figure 11:
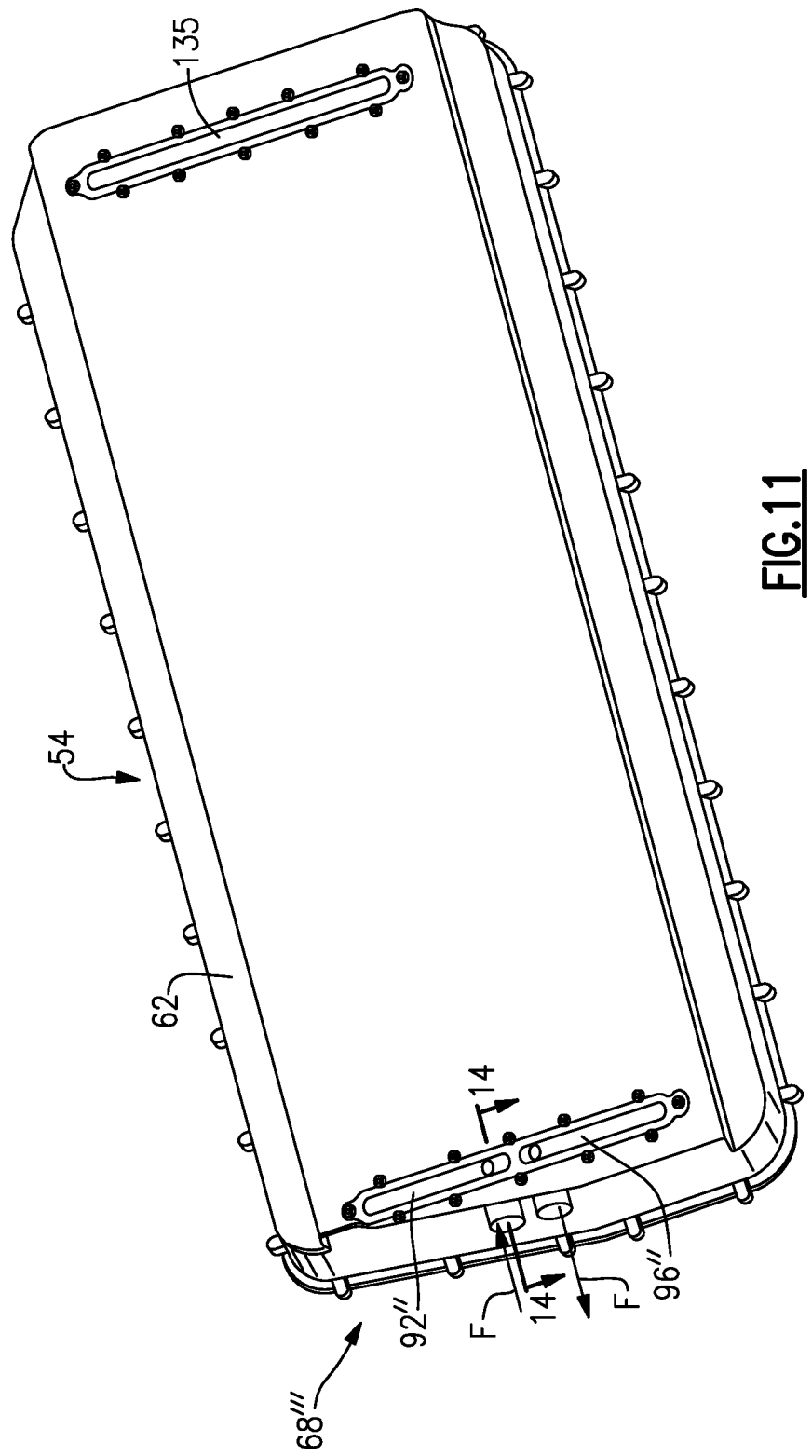
FIG. 11 is a bottom-perspective view of a battery pack including a fourth example thermal exchange assembly.

FIG. 11 illustrates another example battery assembly 54 from a bottom perspective. The battery assembly 54 of FIG. 11 includes another example thermal exchange assembly 68'. In this example, the thermal exchange assembly 68' includes an inlet plenum 92", an outlet plenum 96", and a return plenum 135 provided on an opposite end of the battery assembly 54 relative to the inlet and outlet plenums 92", 96". The thermal exchange assembly 68''' includes a plurality of tubes, as shown in FIG. 12.

Referring to FIGS. 11 and 12, the thermal exchange assembly 68''' includes a plurality of inlet-side tubes 136A-136F configured to direct fluid from the inlet plenum 92" to the return plenum 135. The thermal exchange assembly 68''' further includes a plurality of outlet-side tubes 138A-138F configured to direct fluid from the return plenum 135 to the outlet plenum 96". The tubes 136A-136F, 138A-138F are substantially straight tubes extending in a direction substantially parallel to a length L. The tubes 136A-136F, 138A-138F are all the same size and shape in this example.

Further, in this example, the tubes 136A-136F, 138A-138F are initially formed with closed ends 140, as shown in FIG. 13. The tubes 136A-136F, 138A-138F are crimped at each end thereof to provide the closed ends 140. Providing the tubes with closed ends 140 prevents unwanted material from entering the tubes during manufacturing, including during the overmolding process.

The battery assembly 54 of FIG. 11 is formed similarly to the previous embodiments, however the plenums 92", 96", 135 are formed after the tubes 136A-136F, 138A-138F are overmolded with the housing 62 at step 114 (FIG. 6). With reference to the method 104 of FIG. 6, the plenums 92", 96", 134 are formed at step 142 by machining the plenums 92", 96", 135 into a bottom of the housing 62. In one example, the plenums 92", 96", 135 are formed using a milling process. During the milling process, not only are the plenums 92", 96", 135 formed, but the closed ends 140 are removed from the tubes 136A-136F, 138A-138F, thereby opening the tubes and allowing fluid F to flow therein.

Figure 14:
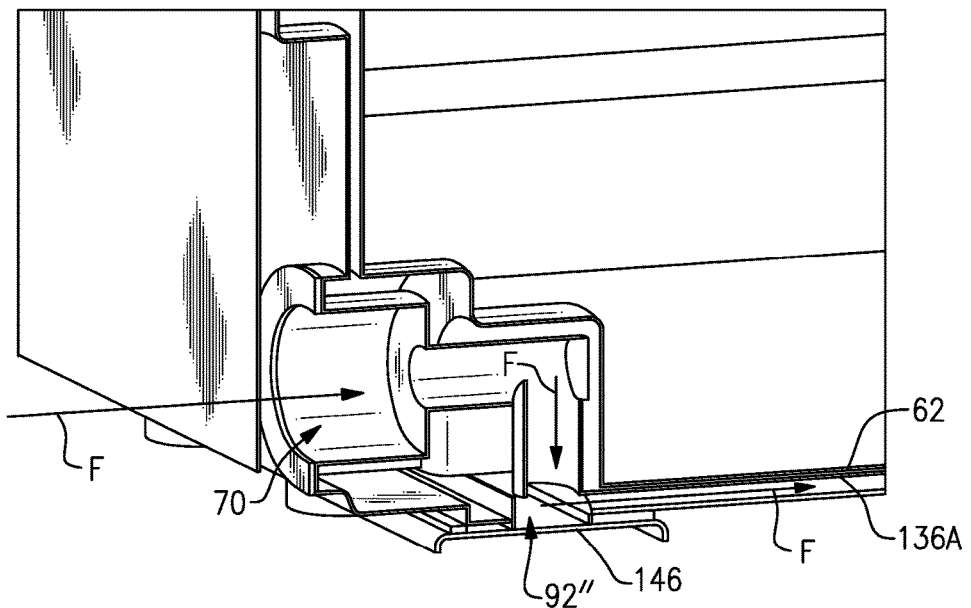
FIG. 14 is a cross-sectional view of the battery pack of FIG. 11 taken along line 14-14 in FIG. 11.

Machining the plenums 92", 96", 135 after the overmolding process leaves open cavities in the bottom of the housing 62. Thus, at step 144 (FIG. 6), plenum caps 146 are provided to cover the plenums 92", 96", 135 by welding, for example. One example arrangement is shown in the cross-sectional view of FIG. 14. In FIG. 14, there is a plenum cap 146 connected to a bottom of the housing 62, which seals the inlet plenum 92". Thus, fluid F is permitted to flow into the inlet 70, to the inlet plenum 92", and along the tube 136A toward the return plenum 135.

Figure 15:
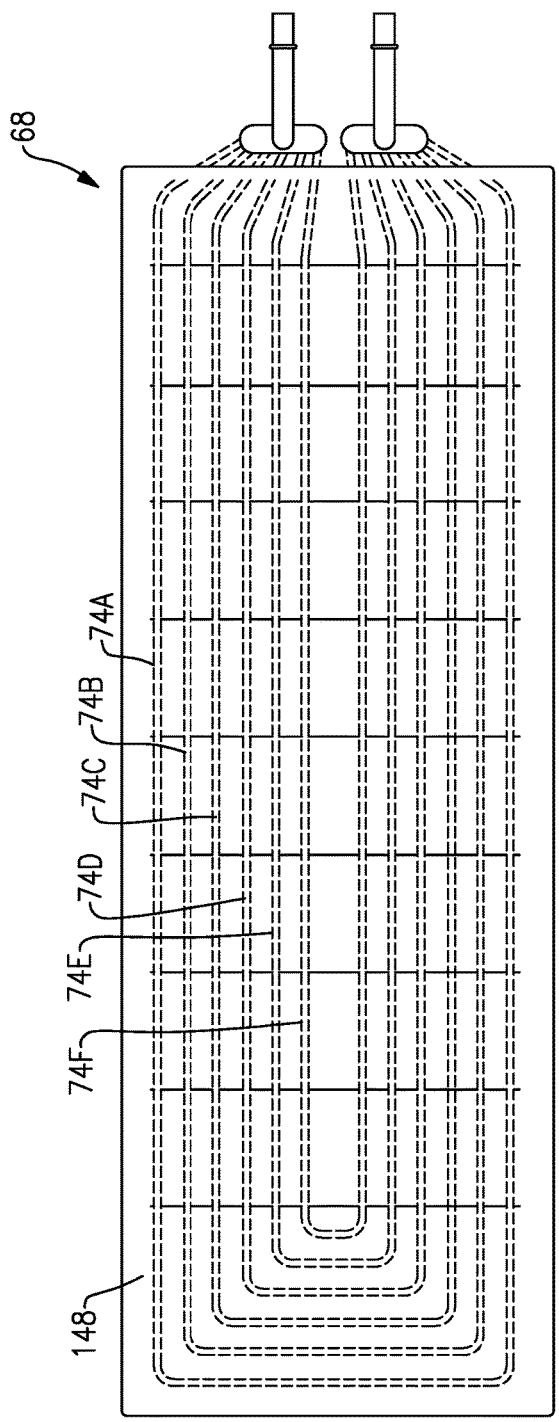
FIG. 15 is a top view of another example battery pack including a thermal transfer plate.
Figure 16:
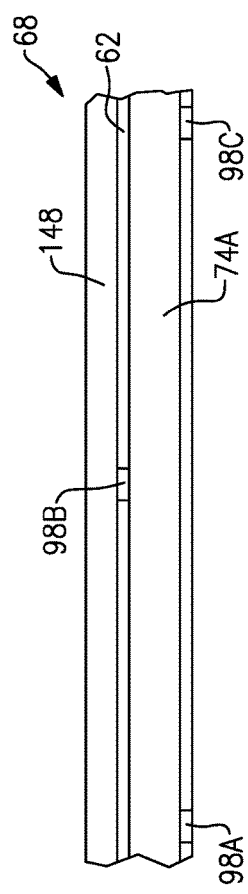
FIG. 16 is a side view of a portion of the battery pack of FIG. 15.

FIGS. 15-16 illustrate the thermal exchange assembly 68 including a thermal transfer plate 148. In this example, the thermal transfer plate 148 sits atop the tubes 74A-74F, and is made of a thermally conductive material. Thus, the thermal transfer plate 148 distributes heat and facilitates heat transfer between the tubes 74A-74F and the cells 58. In this example, the tubes 74A-74F and the thermal transfer plate 148 are overmolded with the housing 62. As shown in FIG. 16, the thermal transfer plate 148 sits directly atop the die setting brackets (e.g., 98B) projecting from the top side of the tubes 74A-74F. The cells 58 of the battery array 56 sit directly on the thermal transfer plate 148 in one example. The thermal transfer plate 148 may be particularly beneficial when the housing 62 is made of a material that has low thermal conductivity, such as when the housing 62 is made of plastic.

Figure 17:
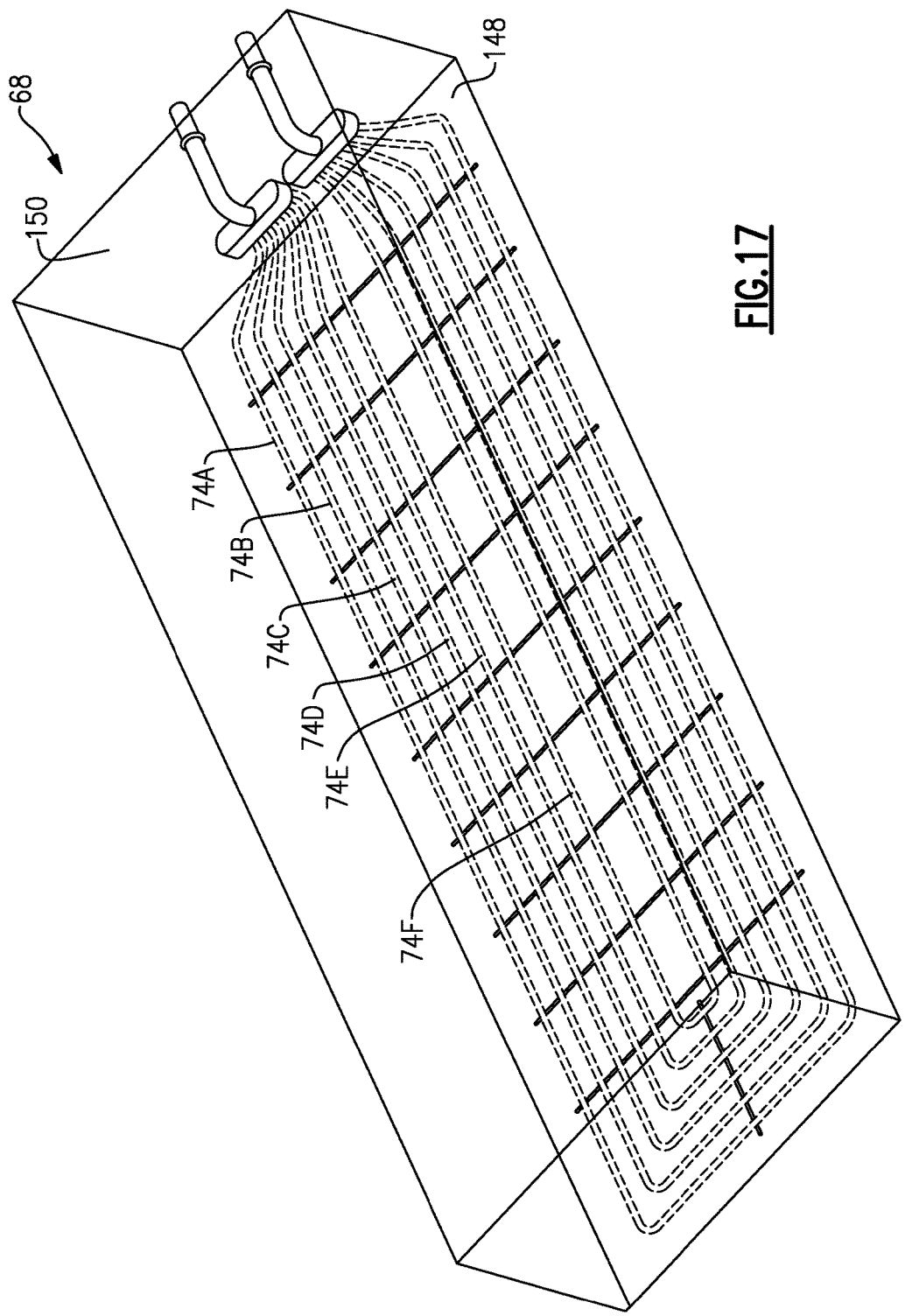
FIG. 17 is a top-perspective view of another example battery pack including an electromagnetic compatibility (EMC) shield.

FIG. 17 illustrates the thermal exchange assembly 68 with an electromagnetic compatibility (EMC) shield 150. The EMC shield 150 is essentially a box formed by a plurality of walls projecting from the thermal transfer plate 148. In this example, the EMC shield 150 is overmolded with the housing 62 together with the thermal transfer plate 148 and tubes 74A-74F. The EMC shield 150 is made of the same material as the thermal transfer plate 148 in one example, or the EMC shield can be provided by other conductive material. The material of the EMC shield is configured to meet EMC regulations.

It should be understood that the above-discussed embodiments are combinable, except where such combination is not possible. For example, the thermal transfer plate 148 and EMC shield 150 could be incorporated into the embodiments of FIGS. 9, 10, and 11. As an additional example, while not shown in FIGS. 10-12, these embodiments could include die setting brackets. Further, it should be understood that the method 104 applies to each of the disclosed embodiments, except where otherwise noted. For example, all of the embodiments disclosed herein include a thermal exchange assembly with one or more tubes overmolded with a housing of a battery assembly. Additionally, each of the disclosed assemblies could include tubes with crimped ends that are opened after overmolding, as described relative to FIG. 13.

It should be understood that references to the length and width directions (e.g., L, W) and terms such as "lateral" are used herein for purposes of explanation, and should not be considered otherwise limiting. Terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A battery assembly, comprising:
a housing;
an array of battery cells provided within the housing; and
a thermal exchange assembly adjacent the array and including an inlet, an outlet, and a tube configured to direct fluid from the inlet to the outlet, wherein the tube is overmolded with the housing.

2. The battery assembly as recited in claim 1, wherein:
the inlet includes an inlet plenum;
the outlet includes an outlet plenum;
the tube is one of a plurality of tubes configured to direct fluid from the inlet plenum to the outlet plenum.

3. The battery assembly as recited in claim 2, further comprising a thermal transfer plate overmolded with the housing and provided between the plurality of tubes and the array.

4. The battery assembly as recited in claim 3, further comprising an electromagnetic compatibility (EMC) shield including a plurality of walls projecting from the thermal transfer plate.

5. The battery assembly as recited in claim 2, further comprising a return plenum provided at an opposite end of the housing than the inlet and outlet plenums.

6. The battery assembly as recited in claim 5, wherein:
the plurality of tubes includes a plurality of inlet-side tubes configured to direct fluid from the inlet plenum to the return plenum, and
the plurality of tubes includes a plurality of outlet-side tubes configured to direct fluid from the return plenum to the outlet plenum.

7. The battery assembly as recited in claim 6, wherein each of the inlet-side tubes and the outlet-side tubes are substantially straight tubes extending in a direction substantially parallel to a length of the battery assembly.

8. The battery assembly as recited in claim 2, wherein each of the plurality of tubes is a single tube including an inlet side, a turning section, and an outlet side.

9. The battery assembly as recited in claim 8, wherein a first one of the plurality of tubes defines a first tube perimeter, and a second one of the plurality of tubes is provided entirely within the first tube perimeter.

10. The battery assembly as recited in claim 9, further comprising a plurality of die setting brackets connecting the first tube to the second tube, and wherein:
a first one of the die setting brackets projects from a first side of the first tube to a first side of the second tube,
a second one of the die setting brackets projects from a second side of the first tube to a second side of the second tube, and
the first sides of the first and second tubes are opposite the second sides of the first and second tubes.

11. The battery assembly as recited in claim 9, wherein:
the first tube is one of a first set of tubes configured to direct fluid from the inlet plenum to the outlet plenum in a first direction, and
the second tube is one of a second set of tubes configured to direct fluid from the inlet plenum to the outlet plenum in a second direction opposite the first direction.

12. The battery assembly as recited in claim 8, wherein each of the plurality of tubes are laterally spaced-apart from one another.

13. The battery assembly as recited in claim 12, wherein each of the plurality of tubes are substantially the same size and shape.

14. The battery assembly as recited in claim 1, wherein the tube is overmolded into a bottom-most wall of the housing.

15. The battery assembly as recited in claim 2, wherein the inlet and outlet plenums are defined partially by the housing and partially by plenum caps connected to the housing.

* * * * *